UNITED STATES PATENT OFFICE.

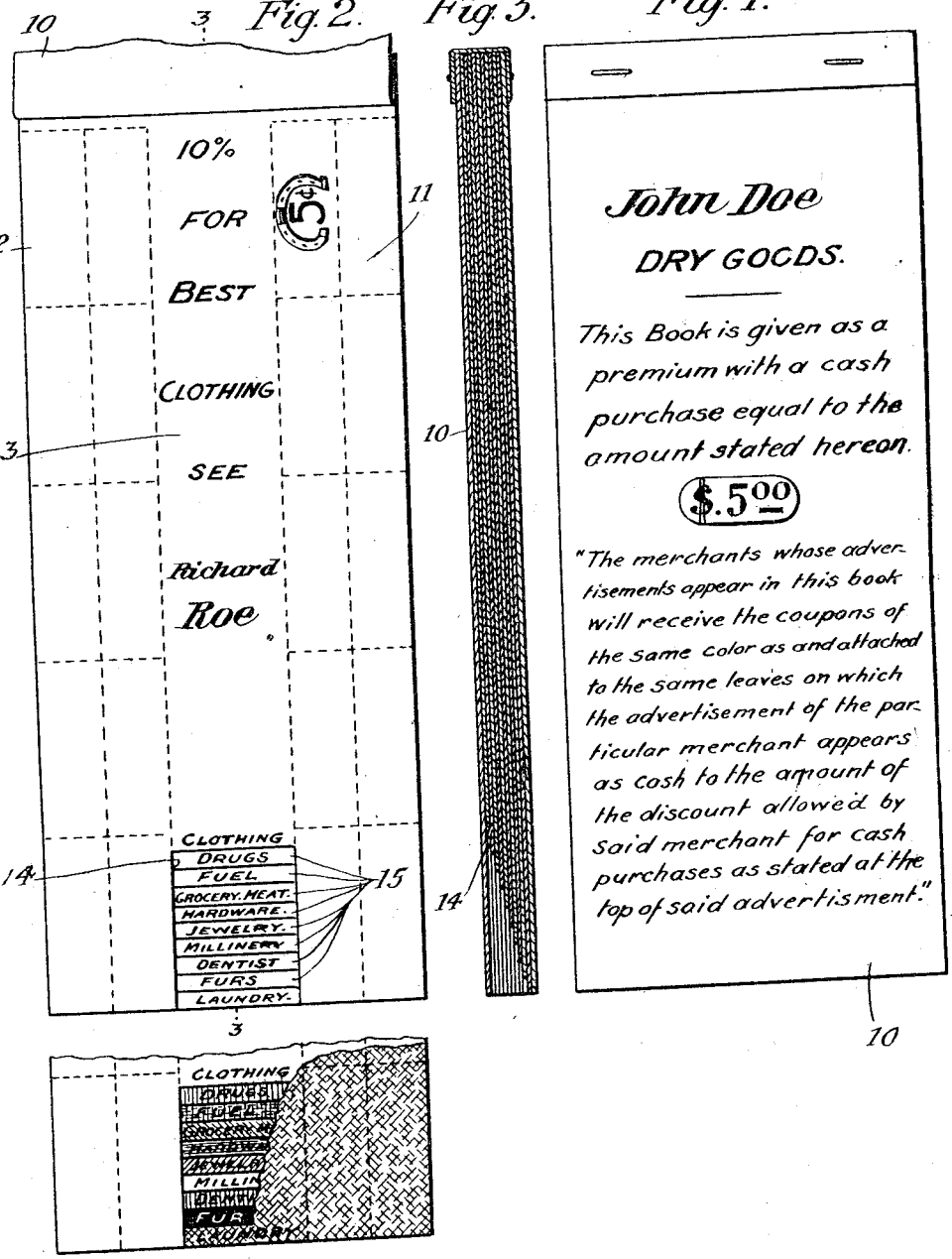

ROY L. CRANDALL, OF MINNEAPOLIS, MINNESOTA.

TRADE-BOOK.

1,132,516.  Specification of Letters Patent.  Patented Mar. 16, 1915.

Application filed December 19, 1912. Serial No. 737,647.

*To all whom it may concern:*

Be it known that I, ROY L. CRANDALL, a citizen of the United States, residing at Minneapolis, in the county of Hennepin and State of Minnesota, have invented certain new and useful Improvements in Trade-Books, of which the following is a specification.

My invention relates to trade books and has for its object to provide a trade book which shall operate as an advertising medium and a means for effecting coöperation in the matter of advertisements and the directing of customers from one dealer to another of a group of such dealers, all handling non-competing lines.

Generally stated, the book comprises a cover of a characteristic color and having thereon an advertisement of a merchant together with a statement to the effect that "This book is given as a premium with a cash purchase equal to the amount stated thereon," such amount being $5.00, $10.00, or any other amount which is desirable. The purpose of this book will also be stated in such language as "The merchants whose advertisements appear in this book will receive the coupons of the same color as and attached to the same leaves on which the advertisement of the particular merchant appears as cash to the amount of the discount allowed by said merchant for cash purchases as stated at the top of said advertisement." The book within the covers will be divided into a series of leaves or sets of leaves, each of such leaves or sets of leaves having a distinctive color, different from every other leaf or set of leaves. On each of said sets of leaves will appear an advertisement of a certain dealer together with coupons printed alongside of said advertisements and receivable by the dealer.

In the drawings, illustrating the application of my invention in one form,—Figure 1 is a view of a book embodying my invention with the front cover closed. Fig. 2 is a front view of a book embodying my invention with the cover raised. Fig. 3 is a sectional view on line 3—3 of Fig. 2. Fig. 4 is a fragmentary view illustrating the manner of interspersing the different colors.

As shown in Fig. 1, the outside cover 10 contains the advertisements as stated and the words to the effect that the book is given as a premium with cash purchases equal to the amount of the book together with the statement that the coupons are redeemable by the merchants advertised in the book. Fig. 2 shows the first sheet or leaf of the book when the cover is raised. The side portions 11 and 12 of said sheet are perforated forming removable coupons which may be marked with a given value, as, for example, 5¢. Upon the central part 13 of the page between the sets of coupons is printed an advertisement of some merchant in a stated line of business. As given, this advertisement reads, "For best clothing see Falk & Hansen." At the top of this advertising portion of the page are the figures "10%." At the bottom of the advertising portion of the page is the word "Clothing" and below the word "Clothing," as indicated at 14, the advertising portion of the leaf is cut away. If more than one leaf is given over to advertisements and coupons of clothing all of such leaves will be of the same color and cut out to the same extent at the bottom of the advertising portion 13 thereof.

As clearly indicated in Figs. 2 and 4, succeeding series of leaves will be provided each of a different color from all of the other series. Each of these leaves will have marginal coupons 11 and 12 and a central advertising space 13, upon the top of which will appear the discount percentage figures, in the intermediate portion the advertisement of the dealer, and at the bottom the business advertised. As best shown in Fig. 3, each succeeding leaf or series of leaves is cut away at the bottom below the advertising portion 13, but cut away to less extent than the leaf or series of leaves preceding it, so that there are exposed margins 15 on which when the book is closed will appear the names of all of the different lines of business advertised, such as clothing, drugs, fuel, groceries and meats, hardware, jewelry, millinery, dentist, furs, laundry, etc. Each line of business will always appear upon a leaf having thereon the advertisement and discount figures of the firm as well as discount coupons removably attached to said leaf. The coupons are redeemable only by the respective merchants to whose advertisements they are directly attached and of course are of the same color as the leaf upon which said advertisement is printed. If the clothing coupon and advertisement are white, drugs red, fuel gray, groceries green, hardware blue, jewelry purple, millinery yellow, furs black or brown, laundry orange, etc., the white coupons will be redeemable only by the clothing merchant advertised, at the percentage appearing at the head of his advertisement, as a discount on cash purchases. Correspondingly the red coupons are redeemable only by the drug merchant, the green coupons by the groceryman, the blue coupons by the hardware dealer, etc.

No coupons appear for the merchant advertised on the outside of the book who gives the book as a premium for cash purchases, and no advertisement of such merchant appears on the inside of the book. In practice each of the merchants of the group who join together in the use of the book will have a set of books in which the advertisement of the merchant possessing that set appears only on the cover thereof and advertisements and coupons of all of the other merchants of the group appear in order through the body of the book, the cut away portions at the bottoms of the advertising parts of the leaves exposing the different lines of business in order so that the holder of the book can see at a glance what lines redeem coupons and can use the book accordingly. It is not contemplated nor necessary that the number of coupons for each of the merchants advertised in the book shall be the same, as certain merchants, such, for example, as grocerymen, might have a much larger number of coupons and a relatively smaller discount percentage. But in any event only coupons connected with and of the same color as the leaves bearing a merchant's advertisement are redeemable by that merchant.

The books are put in circulation by all of the merchants and are given as a premium for cash purchases. For example, if a customer purchases of Smith & Williams a bill of dry goods amounting to five dollars or more, paying therefor cash, Smith & Williams will give as a premium a coupon book redeemable not by Smith & Williams but by the clothing, drug, fuel, grocery, hardware and other merchants advertised in the book. A book of the value of the cash purchase is given. If, on the other hand, the customer buys from Smith & Williams a bill of dry goods for cash amounting to five dollars and Smith & Williams have in their advertisements appearing in connection with coupons given out by the other merchants of the group set a discount of ten per cent., and the customer presents such coupons, then Smith & Williams will accept fifty cents worth of the coupons and four dollars and fifty cents in cash in payment for the purchase. When the book is given as a premium coupons will not be redeemed, and vice versa.

The advantages incident to the use of my trading book will be apparent. The group of merchants represented in the book carry non-competing lines. Each merchant of the group will, of course, have many customers who normally do not trade with other members of the group. By giving the book as premiums the merchants will be enabled effectually to encourage cash transactions and increase the amounts thereof with their own customers. When the books are placed in circulation the customers of each of the group of merchants will be induced to go to all the other and non-competing merchants of the group to obtain goods in the lines which such merchants carry, and these transactions will then be the much desired cash transactions. All of the merchants of the group will be most effectively advertised, as every book that is given out advertises each one of the merchants of the entire group. The effect of the use of my trading book will be to associate together a group of non-competing merchants in such manner that each thereof will become known to the customers of all of the others and will provide special inducement to obtain the trade of such customers.

I claim:

A trading book comprising a cover and a series of distinctive sets of leaves, said cover having thereon advertising matter of a dealer in one specific line of business only, each leaf of each of the respective sets of leaves containing a series of removable coupons along both sides thereof and a central permanently attached portion on which appears an advertisement of a dealer other and in a different specific line of business than that advertised on the cover, each set of said distinctive sets of leaves advertising and containing coupons redeemable in a line of business distinct from and non-competing with all other lines advertised in the book, the central portions of the respective sets of leaves being successively cut away at the bottom, the exposed portions of said sets of leaves bearing printed matter thereon indicative of the line of business advertised on that set of leaves.

In testimony whereof I affix my signature in presence of two witnesses.

ROY L. CRANDALL.

Witnesses:
F. A. WHITELEY.
H. A. BOWMAN.